Figure 3:
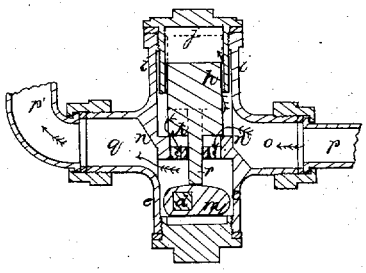

T. Grundy,

Water-Closet Valve.

No. 1,697. Reissued June 14, 1864.

UNITED STATES PATENT OFFICE.

WILLIAM E. PARMENTER, OF WEST CAMBRIDGE, (EXECUTOR OF THOMAS GRUNDY, DECEASED,) AND JOSEPH GRUNDY, OF STONEHAM, AND JAMES GRUNDY, OF MELROSE, MASSACHUSETTS, ASSIGNEES OF SAID THOMAS GRUNDY.

IMPROVEMENT IN WATER-CLOSETS.

Specification forming part of Letters Patent No. 28,853, dated June 26, 1860; Reissue No. 1,697, dated June 14, 1864.

*To all whom it may concern:*

Be it known that the late THOMAS GRUNDY, formerly of Melrose, in the county of Middlesex and State of Massachusetts, invented an Improvement in Water-Closets; and we do hereby declare that the following, taken in connection with the drawings which accompany and form part of this specification, is a description of his invention sufficient to enable those skilled in the art to practice it.

In the operation of water-closets it is always important to have and to keep the pan and the hopper partially filled with water when the pan is closed, so as to seal the hopper, and thereby effectually cut off communication with the soil-pipe, thus preventing the escape of foul gases; but in general the valve of the cock controlling the flow of water into and through the hopper and pan is closed as quickly as is the pan, and thus when the pan is closed the flow of water is shut off, and a sufficiency of water is not obtained from its source to seal the hopper, notwithstanding a large amount may have passed through the closet, cleansing the same, while the pan is open.

To remedy this objection by insuring the entrance of a sufficient supply of water into the pan after it is closed, without regard to the quickness with which it has its closing movement, so that the hopper will be sealed by the immersion of its lower open end in the water contained in the pan is the end proposed to be attained by this invention.

The invention consists in the peculiar arrangement of a plunger connected with the valve of the water-controlling device, and fitting loosely within a cylinder closed at one end with relation to the inlet and outlet passages of said device or cock, so that said valve and plunger are less subject to the influence of the current tending to close the valve than in other devices designed for the same purpose, and so that the valve and plunger descend by the influence of gravity alone as fast as the water can pass the plunger into the space left in the cylinder above by the descent of the plunger, and no faster, said arrangement rendering it practicable to lift the valve from beneath by suitable mechanism there operating, which is a desideratum, because no packing is required where the parts which lift the valve pass through the case of the cock, inasmuch as the water which leaks past said parts may be easily conducted into the hopper of the closet, which leakage is less on the exit side of the valve than it would be through like apertures in the inlet or pressure side. The said peculiar arrangement, by bringing both the valve and plunger above the valve-seat, renders it possible to make the valve and plunger in one piece, whereas in cases where the valve is on one side of its seat and its plunger is on the other side, they have to be connected by a joint of some kind, such construction being more expensive an difficult than that herein shown.

Figure 1:
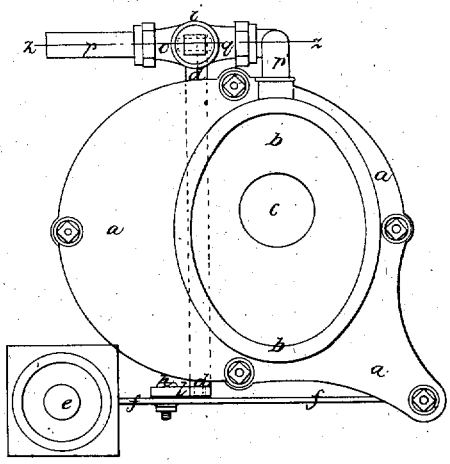
Figure 2:
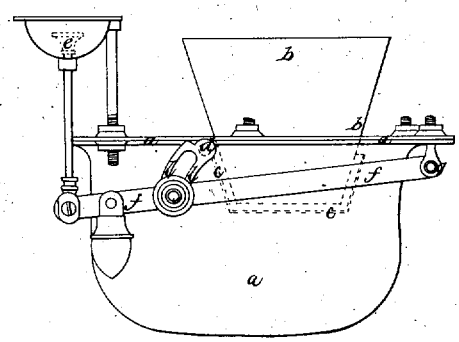

Of the drawings, Figure 1 is a plan or top view of a water-closet provided with a cock embodying this invention. Fig. 2 is a side elevation of the same; and Fig. 3 is a detailed view of said cock, showing it in vertical longitudinal section, taken in the line *z z*. (Seen Fig. 1.)

*a* represents the outer case of the closet; *b*, the hopper; *c*, the pan, which is secured to the rock-shaft *d*, so that by turning said shaft the pan will be tipped down to discharge its contents, and so that when the pan is in its normal position, as seen in Fig. 2, it surrounds the open lower end of the hopper.

The pan is operated by means of the handle *e*, which takes hold of one end of the weighted lever *f*, the other end of the lever being pivoted to the case *a* at *g*. To this lever there is fixed a pin, *h*, so arranged as to vibrate in a groove formed in an arm, *l*, said arm being fixed on the rock-shaft *d*. It is obvious that in the vibration of the lever pin *h* will impinge against one side or the other of the groove in the rocker-arm *l*, and that this will partially rotate the rock-shaft *d*, this causing the pan *c* to open or close, according as the handle *e* is drawn up or pushed down, and, further, that the weight on lever *f* always tends to close the pan and keep it closed.

Located in or between two parts of the supply-pipe *p p'* is a cock or water-controlling device, the main body or outer casing of which is marked *i*, and is provided with lateral branches. One (marked *o*) receives the water from *p* into the body of the cock and above the valve-seat *n* therein, and the other (marked *q*) receives the water as it passes the valve-seat, and discharges it into the pipe *p'*, which supplies the closet. The direction in which the water passes through *i* is shown by the arrows in Fig. 3. The valve which rests on the valve-seat *n* is elongated, so that it forms a cylinder, (marked *k*,) which fits like a plunger loosely in a cylinder, *j*, contained in case *i*, and closed at its upper end. There is a stem, *r*, to the plunger-valve *k*, which passes as a guide through the hub *s* of the valve-seat, and serves also for the cam *m* to impinge against in lifting *k* to permit the flow of water. The shaft *d* projects through the case *i* into the space within and beneath the valve-seat *n*, and there is fixed to the end of shaft *d*, within *i*, a cam, *m*, so arranged that it turns upward when shaft *d* is turned by the lifting of handle *c*. This causes *m* to impinge against *r* and to lift *k* off from its seat *n*, allowing water to flow through *i* to supply the closet. When the pan of the closet is closed, it is obvious that *k* will rest on its seat *n*, and that *o* and all the space in *i* above *n* and in *j* will be filled with water. Now, if *k* is raised by the mechanism described, it is obvious that the water in *j* above *k* must be displaced by being forced out of *j* past *k*. When the handle *e* is dropped, *m* at once assumes the position shown in Fig. 3, and the pan *c* closes, but *k* remains suspended above the valve-seat *n*, and it is evident that it cannot descend any faster in the water filling the case *i* than the water can fill the space above *k* in *j*, caused by the gravitation of *k* downward. The plunger-valve *k* therefore remains open for some time after the pan *c* closes, and the consequence is that the water continues to flow through *i*, and the pan is flooded, sealing therein the lower end of the hopper. The less the difference between the diameter of *k* and bore of *j* the longer will be the time of the descent of *k*, because as the space between the sides of *k* and *j* is diminished the more difficult and slow will be the passage of the water to supply the space left in *j* as *k* descends. Were it not that water can thus pass into *j* above *k* the valve-plunger could not descend at all, because a vacuum would be produced above *k* and the pressure of the fluid contents in *i* and the friction between *j* and *k* would more than counterbalance the weight of *k*, and would keep the plunger fixed at its highest elevation. It is true that this is not the first fluid-controlling device which has a retarder connected with the valve operating to retard its close by the difficulty with which fluid escapes past or through a plunger, this being the retarder and fitting loosely in a cylinder. Such a device exists in the United States Patent No. 26,145; but it is not novel, broadly, in said patent, and is not claimed so therein, the claim being to the use of a connected valve and plunger when arranged relatively to the inlet and outlet of the cock as described—that is to say, with the top of the valve exposed to the current of water passing through the cock, the valve being above the seat on the pressure side of the cock, and the plunger being below the valve-seat, also exposed to the rush of water as it passes through the cock.

The arrangement of the valve and plunger claimed in said patent is objectionable, because of the tendency of the currents through the cock to close the valve therein and to close it with a blow; but in this invention it may be plainly seen that neither the valve nor plunger is exposed to superimposed action of the current, and that, therefore, other things being equal, this valve will not close as quickly as will the valve in said patent, nor will it close as does the one referred to, with a blow. When this valve falls, the water passes downward against part of the periphery of the plunger and upward against so much of its periphery as is contained in the cylinder *j*. The cylinder *j* is made adjustable within *i*, as shown, by means of screw-threads, the object being the regulation of the time of the falling of the valve. If the cylinder *j* is raised, then the plunger *k* will not be entered therein as far as before, and the passage between *j* and *k* to the space left in the descent of *k* being shortened, the friction of the water will be less in passing to the supply of said space, which, in consequence, will be more quickly filled. Thus it will be seen that the fall of the valve may be made quick or slow, according as the cylinder *j* is adjusted up or down, with reference to the valve and its seat.

In this specification the word "plunger" is used in its exact technical sense, as meaning a device fitted so loosely within its containing case or cylinder that one does not come into contact with the other, but leaves room for the passage of fluid between the two. A plunger is distinguished from a piston in that a piston is made to fill closely its cylinder or containing-case, the substance of both parts being actually in contact and not intended to allow fluid to pass the surfaces in contact.

Water-closets are frequently unused for some length of time, during which a piston would stick or become set in its cylinder from oxidation or from stiffening of its packing. Where a diaphragm is used it will become stiff, if made of rubber or leather or other similar material, and thin metallic diaphragms break under constant flexure. The plunger does not give the trouble nor has it the faults in use of either the piston or diaphragm, both of which are hereby specially disclaimed as not being the equivalents of the plunger for use in water-closet valves.

What is claimed is—

Arranging a valve or plunger, or both, above the valve-seat, and with reference to the inlet and outlet passages of a water-controlling device, substantially as specified—that is to say, so that either or both the valve and plunger shall be relieved or protected from the superimposed impingement thereupon of the current passing through such a device.

In testimony whereof we have hereunto set our signatures this 15th day of December, A. D., 1863.

WILLIAM E. PARMETER.

Administrator with the will annexed of Thomas Grundy, and assignee.

JOSEPH GRUNDY.

JAMES his × mark. GRUNDY.

Witnesses:

S. M. McINTIRE,

J. B. CROSBY.